United States Patent [19]

Welter

[11] 4,405,007

[45] Sep. 20, 1983

[54] PNEUMATIC SAFETY TIRE

[75] Inventor: Thomas N. H. Welter, Keispelt, Luxembourg

[73] Assignee: The Goodyear Tire & Rubber Company, Akron, Ohio

[21] Appl. No.: 810,658

[22] Filed: Jun. 27, 1977

[51] Int. Cl.³ .............................................. B60C 17/00
[52] U.S. Cl. ........................... 152/353 R; 152/330 RF
[58] Field of Search ........... 152/353 R, 353 C, 330 R, 152/330 RF, 330 L, 330 C

[56] References Cited

U.S. PATENT DOCUMENTS

| 3,782,440 | 1/1974 | Depmeyer | 152/330 R |
| 3,911,987 | 10/1975 | Takusagawa et al. | 152/353 R X |
| 3,913,654 | 10/1974 | French | 152/353 R X |
| 3,949,798 | 4/1976 | Gardner et al. | 152/353 R X |
| 3,954,131 | 5/1976 | Hoshino | 152/330 RF X |

FOREIGN PATENT DOCUMENTS

| 1191745 | 5/1970 | United Kingdom | 152/353 R |
| 1430763 | 4/1976 | United Kingdom | 152/353 R |

Primary Examiner—Robert J. Spar
Assistant Examiner—Donald W. Underwood
Attorney, Agent, or Firm—Frank Pincelli

[57] ABSTRACT

A pneumatic safety tire having a ground-engaging tread portion, a pair of sidewall portions, a pair of bead portions, a carcass structure which extends from bead portion to bead portion, a tread-reinforcing belt structure placed circumferentially about the carcass structure and beneath the tread portion. Each sidewall is provided with reinforcing means which extend circumferentially and uninterruptedly along the internal surface of the tire from a point radially below the maximum section width of the tire to a point beneath the tread portion before reaching the mid-circumferential plane of the tire. The surface of the reinforcing means facing the tire cavity have generally a corrugated cross-sectional configuration as viewed in a plane perpendicular to the tire surface and radial plane of the tire. The corrugations lie in a plane substantially perpendicular to the mid-circumferential plane of the tire.

55 Claims, 8 Drawing Figures

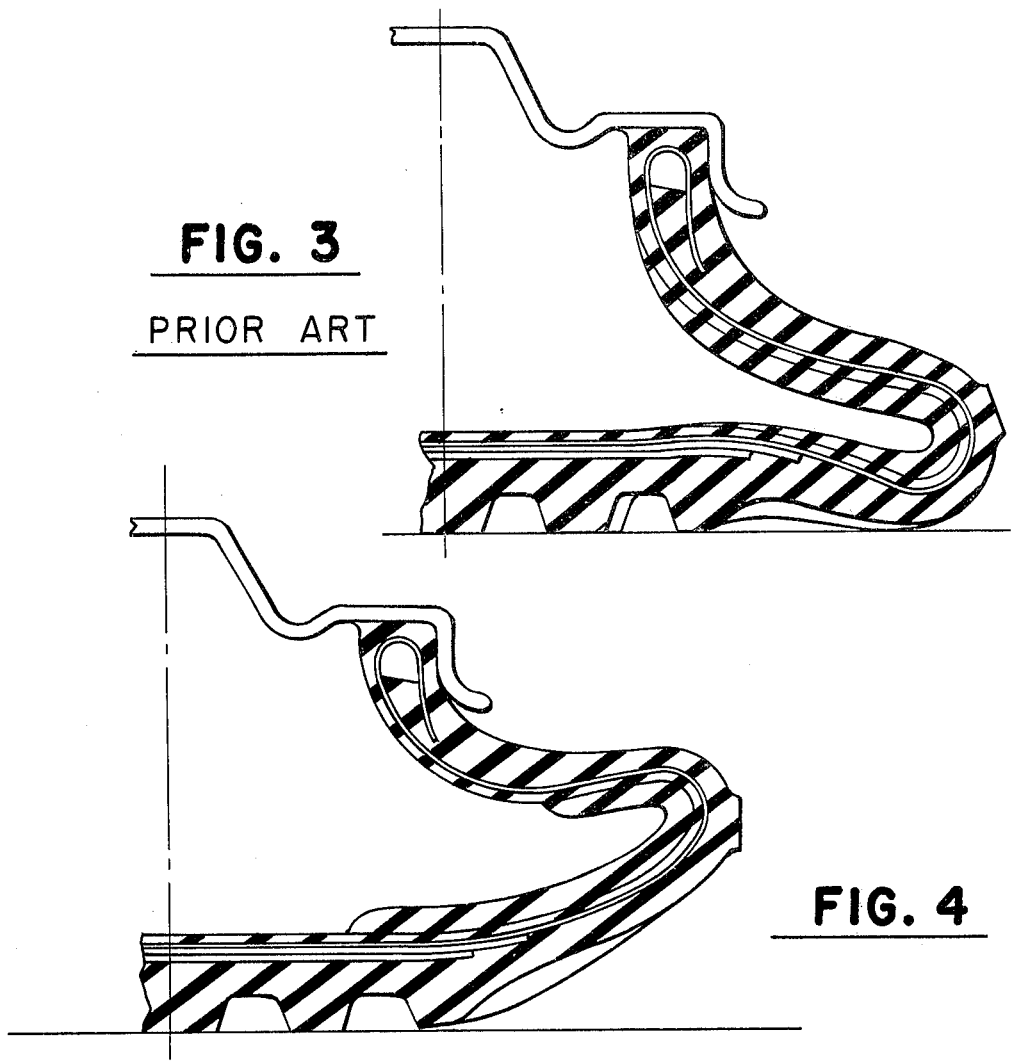
FIG. 3 PRIOR ART
FIG. 4
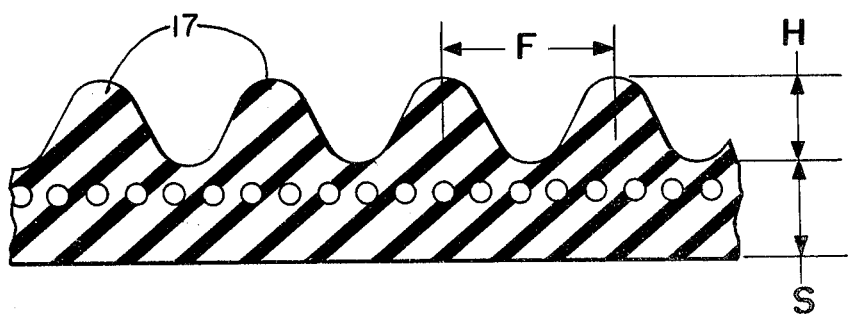
FIG. 5
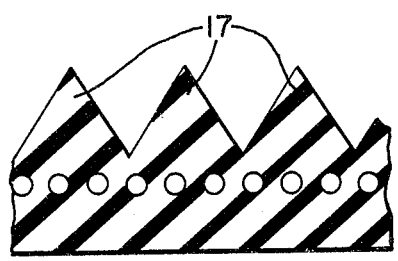
FIG. 6
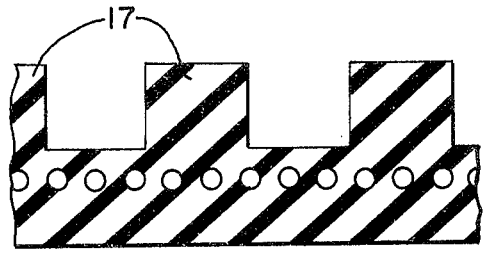
FIG. 7

PNEUMATIC SAFETY TIRE

The foregoing abstract is not to be taken as limiting the invention of this application, and in order to understand the full nature and extent of the technical disclosure of this application, reference must be made to the accompanying drawings and the following detailed description.

BACKGROUND OF THE INVENTION

This invention relates to pneumatic tires. More particularly, this invention relates to pneumatic tires capable of being used in the uninflated condition.

Various tire constructions have been suggested which are capable of being used in the uninflated condition. One approach taken is to increase the sidewall stiffness so that the tire can support the vehicle by itself. These tires are generally stiffened by simple thickening the sidewall members by a substantial amount in relation to its normal thickness. Other tires have been stiffened by the placement of an annular sidewall reinforcing means comprising essentially an elastomeric material molded or adhered to the internal sidewall region and having a substantially uniform thickness throughout. For example, as illustrated in U.S. Pat. Nos. 3,911,987; 3,935,892; 3,954,131 and 3,964,532. These tires have a weight disadvantage because of the high amount of rubber in the shoulder area which introduces high centrifugal forces and tends to reduce the durability of the tire. Further, the increased amount of rubber in the sidewall increases the amount of heat generated during use, which becomes even more important when the tire is used in the uninflated condition to the point that the tire may prematurely fail.

British Pat. No. 1,471,883 discloses a pneumatic tire having corrugations formed in the sidewall of the tire. This patent states that the corrugations are preferably formed on the exterior surface of the tire, the interior surface of the sidewall remaining generally plain. The corrugations are described as extending from a point above the rim flange contacting portion of the tire bead to the shoulder of the tire. This patent does not disclose the manner in which the corrugations should be placed on the interior sidewall of the tire.

BRIEF DESCRIPTION OF THE INVENTION

The tire of the present invention minimizes the above disadvantages in uninflated run-flat safety tires which use thickened sidewalls or annular sidewall reinforcements, while still maintaining desired tire performance. It has been found desirable to minimize flexing of the tire sidewall in the shoulder area and have the point of maximum sidewall flexure occur in the area between the flange of the rim and the maximum cross-sectional width of the tire. It has also been found desirable to have the surfaces of the reinforcing means facing the tire cavity have a corrugated cross-sectional configuration as viewed in a plane perpendicular to the tire surface and radial plane of the tire. This type of configuration reduces the amount of rubber required to provide a given stiffness to the sidewall for use in the uninflated condition and provides an increased surface area for cooling purposes.

A tire according to the present invention, is provided with a ground-engaging tread portion, a pair of sidewall portions, a pair of bead portions each having an annular inextensible bead core, a carcass structure which extends from bead portion to bead portion, a tread-reinforcing belt structure placed circumferentially about the carcass structure and beneath the tread portion; characterized in that each sidewall is provided with a reinforcing means which extends circumferentially and uninterruptedly along the internal surface of the tire from a point radially below the maximum section width of the tire to a point beneath the tread portion terminating prior to reaching the mid-circumferential plane of the tire, the surface of the reinforcing means facing the tire cavity having generally a corrugated cross-sectional configuration, as viewed in a plane perpendicular to the surface of the tire and radial plane of the tire, each of the corrugations lying in a plane substantially perpendicular to the mid-circumferential plane of the tire.

It is an object, therefore, of the present invention to provide a pneumatic safety tire capable of being used in the uninflated condition for a minimum distance and at a maximum speed, which, after being used in this condition, can be repaired and returned to normal use.

Other objects will be in part apparent and in part pointed out in detail hereinafter.

BRIEF DESCRIPTION OF THE DRAWING

FIG. 3 is a cross-sectional view of a tire according to the prior art in the uninflated state.

FIG. 4 is a cross-sectional veiw of a tire according to the present invention in the uninflated state.

FIG. 5 is an enlarged, fragmentary, cross-sectional view of the tire of FIG. 1 taken along line V—V of FIG. 1.

FIG. 6 is a fragmentary, cross-sectional view of a modification of a tire according to the present invention illustrating a modified form of the reinforcing means.

FIG. 7 is a fragmentary, cross-sectional view of a further modification of a tire according to the present invention illustrating a modified form of the reinforcing means.

DETAILED DESCRIPTION OF THE INVENTION

Figure 1:
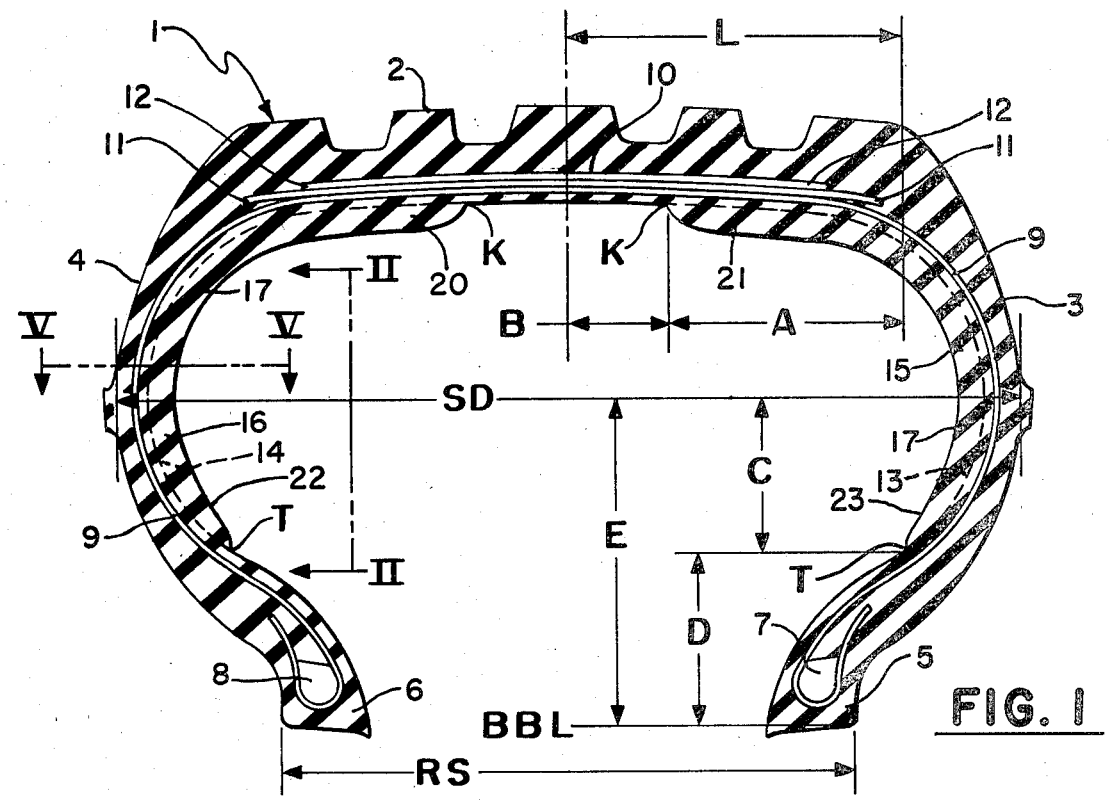
FIG. 1 is a cross-sectional view of a pneumatic safety tire according to the present invention.
Figure 2:
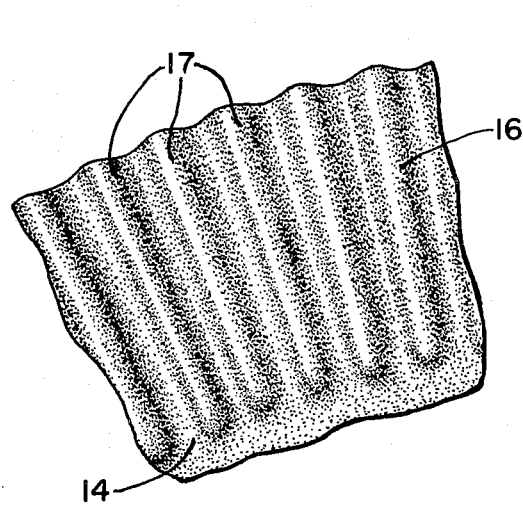
FIG. 2 is a fragmentary side view of a reinforcing means according to the present invention taken along lines II—II of FIG. 1.

Referring to FIG. 1, a pneumatic tire 1 of this invention is provided with a ground-engaging tread portion 2, a pair of sidewall portions 3 and 4 extend from the tread portion 2 and terminate in a pair of bead portions 5 and 6 having annular inextensible bead cores 7 and 8, respectively. The tire is further provided with a carcass structure 9 which extends from bead portion 5 to bead portion 6 and a tread-reinforcing belt structure 10 which extends circumferentially about the carcass structure 9 and beneath the tread portion 2. In the preferred embodiment of the present invention, carcass structure 9 is substantially radial. For the purposes of this invention, a substantially radial carcass shall be considered as a carcass structure in which its cords form an angle from 75 degrees to 90 degress with the mid-circumferential plane of the tire. The carcass structure may comprise a single ply or a plurality of plies. The tread reinforcing belt structure, as illustrated in FIG. 1, has reinforcing belt plies 11 and 12. However, belt structure 10 may be of any known construction and made of any desired material, or may even be entirely omitted.

The sidewall portions 3 and 4 are provided with reinforcing means 15 and 16 which extend circumferentially and uninterruptedly along the internal sidewall surfaces 13 and 14 of the tire 1 from a point radially below the maximum section width SD of the tire 1 terminating at a point beneath the thread portion and prior to reaching the mid-circumferential plane of the tire 1. The maximum section width SD of the tire is the maximum distance between the outside surfaces of the tire sidewalls exclusive of lettering or indicia as measured in the radial plane of the tire when the tire is mounted on a rim and inflated within the normal inflation pressure range.

The reinforcing means 15 and 16 comprise elastomeric material and are preferably molded to the inside surfaces 13 and 14 during vulcanization of the tire 1. However, if desired, the reinforcing means 15 and 16 may be formed by any process and adhered to sidewall surfaces 13 and 14 in any manner either before or after the tire has been cured. For the purpose of this invention, the reinforcing means shall be that portion of the tire as measured from the top of the corrugation to the base of the valleys between the corrugation, and the sidewall portion of the tire shall be considered that portion of the tire measured from the base of the corrugation to the exterior surface of the tire. The ends 20 and 21 of the reinforcing means 15 and 16 which lie beneath the tread portion terminate a distance A from the tread edge of the tire which the reinforcing means passes beneath. The distance A being greater than the distance B, the distance from the reinforcing means ending disposed beneath the tread portion of the tire to the mid-circumferential plane of the tire, whereby the sum of the distance A and B is equal to the distance L, the distance from the tread edge to the mid-circumferential plane of the tire 1. Alternatively, the distance A may be stated as being greater than 50 percent of the distance L. The tread edge of the tire 1 is determined from the tire footprint when the tire is at rated load and inflated within the normal pressure range for that tire.

The ends 22 and 23 of reinforcing means 15 and 16 below the maximum section width SD terminate at a distance C radially inwardly from the maximum section width SD. The distance C being less than the distance D, the distance from termination points T of ends 22 and 23 to the bead base line BBL, a line tangent to the innermost portions of the bead heel sharp point and parallel to the rotational axis of the tire 1. For the purpose of this invention, the bead heel sharp point is defined by the intersection of the projection of the bead seat taper line in the bead heel area and the projection of the line formed by the lateral face of wheel rim which prevents lateral movement of the tire. The sum of the distance C and D is equal to the distance E, the distance from the maximum section width SD of the tire 1 to the bead base line BBL. Alternatively, the distance C may be stated as being less than 50 percent of the distance E.

The reinforcing means 15 and 16 according to the present invention require sidewall portions 3 and 4, in the uninflated condition, to flex in an area between the flange of the rim and the maximum section width SD of the tire 1. Having the tire flex in this manner prevents sidewall scrubbing and reduces the amount of flexing in the shoulder area of the tire 1. For the purpose of this invention, sidewall scrubbing shall be defined as being when the portions of the sidewall contact the road surface when the tire is in the uninflated state as is exemplified by FIG. 3 The reduction of flexing in the shoulder area reduces the amount of heat generated therein due to hysteresis losses and internal friction, a factor which becomes of greater importance when a tire is used in the uninflated condition.

The reinforcing means 15 and 16, as previously stated, have a generally corrugated cross-sectional configuration and comprises a plurality of corrugations or ribs 17 which extend substantially perpendicular to the mid-circumferential plane of the tire 1. The preferred corrugated cross-sectional configuration is sinusoidal as is shown in FIG. 5. However, other cross-sectional configurations may be used; for example, triangular and/or square-toothed as is shown in FIGS. 6 and 7.

A tire made in accordance with the present invention having reinforcing means with a generally corrugated cross-sectional configuration is advantageous over prior art tires having thickened sidewalls or uniform thickness reinforcing means in that tires according to the present invention require less elastomeric mass to maintain the desired sidewall stiffness thereby reducing the amount of heat generated in the tire and reducing centrifugal forces acting on the tire. Furthermore, a tire made in accordance with the present invention has a greater surface area for improved cooling purposes throughout the sidewall area.

Prolonged use of the tire in the uninflated condition may be enhanced by providing a lubricant in the tire cavity. The lubricant may be present in the tire cavity during normal operating conditions or may be dispensed into the tire cavity when the tire goes to the uninflated state. The amount of lubricant necessary will, of course, depend on the size of the tire and the physical properties of the particular lubricant chosen. Suitable lubricants of the liquid kind like oils or water dispersions with solids, or of the solid kind like little balls or powders may be chosen.

A pneumatic tire made in accordance with the present invention, when in the complete uninflated condition, and containing polystyrene balls or a glycol water mixture to the amount of less than 15 percent of the inflated tire cavity volume, but in absence of any reinflation, is capable of being driven (in city and highway driving) for a distance of at least 60 miles (100 Kilometers) at an average speed of 45 miles per hour (70 kilometers per hour) and a maximum speed of 50 miles per hour (80 kilometers per hour). In the case of a puncture the tire may after such run flat use be repaired and returned to normal service.

In order to provide sufficient sidewall stiffness the relationship between the rib thickness H and the distance F, the distance between the center lines of adjacent ribs 17, is such that the distance F divided by the distance H is greater than 1. For the purpose of this invention, the rib thickness shall be considered the same as the thickness of the reinforcing means. Preferably, the relationship between the distance F and the distance H is such that F divided by H is at least equal to 2 but less than or equal to 5.

The thickness H of the reinforcing ribs 17 with respect to the sidewalls 3 and 4 is such that thickness H is greater than the sidewall thickness S, wherein S and H are measured at the maximum section width SD, excluding adornment or other indicia. As previously stated, the sidewall thickness is measured from the base of the valleys between the corrugation to the exterior sidewall surface. The maximum value for H with respect to the sidewalls 3 and 4 should be such that H is greater than S but less than three times the sidewall thickness S. Alternatively, the rib thickness may be expressed in relation to the maximum section width SD of the tire 1, such that the thickness H may range from 3 percent to 8 percent of the maximum section width SD of the tire 1. For example, in a tire having a sidewall thickness S of 0.2 inch (5 mm), the rib thickness H may range from a thickness of at least 0.2 inch (5 mm) to a thickness less than 0.6 inch (15 mm).

The ends 20, 21, 22 and 23 of reinforcing ribs 17 decrease in thickness as they approach termination points K and T. The reinforcing ribs 17 begin to decrease in thickness a distance from the termination points K and T no greater than three times the rib thickness H.

The aspect ratio of a tire according to the present invention and present compound technology may range from 30 to 80, preferably from 50 to 65.

Reinforcing sidewall means 15 and 16 are made from an elastomeric rubber compound having a Shore A hardness ranging from 70 to 85, a static modulus greater than 45 Kp/cm$^2$, a low hysteresis value and a low compression set value, preferably a compression set value as low as 10 percent when the compound is subjected to a 25 percent compression on a 24 hour test, one Kp being equal to 9.81 newtons.

The bead seat spacing RS, i.e. the distance between the bead heel sharp points, when the tire is mounted on a rim at normal inflation pressures, is no greater than the tread width of the tire 1. Preferably, the distance RS is such that the bead heel sharp points lie a distance from a plane perpendicular to the axis of the tire passing through the tread edge of the tire 1 no greater than the distance in which the ends of the reinforcing means beneath the tread portion lie from the same plane.

It is to be understood that the tire designer can adjust for the desired performance of a particular tire by varying the physical relationship of the tire and reinforcing means as herein set forth, in accordance with the prescribed limits.

Prolonged durability of the tire in the uninflated condition may be further enhanced by providing the reinforcing means with chopped filaments, preferably up to a maximum of 10 percent by weight. These filaments may be made of any desired material, for example, aramid, steel, glass, cotton, nylon, rayon. The preferred filament direction is such that a majority of the filaments lie in a plane substantially perpendicular to the mid-circumferential plane of the tire 1. Preferably, the filaments form an angle from 75 degrees to 90 degrees with respect to the mid-circumferential plane of the tire.

Figure 8:
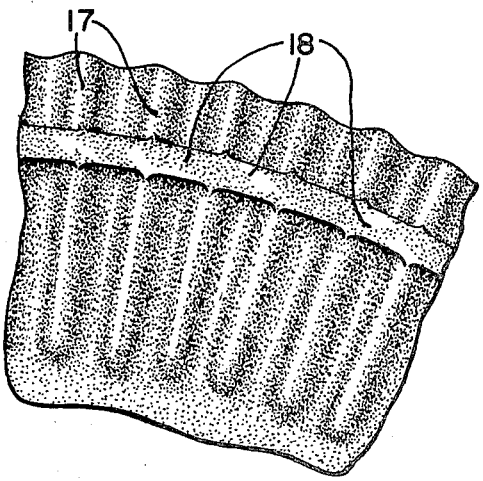
FIG. 8 is a fragmentary side view similar to FIG. 2 of a tire according to the present invention illustrating a still further modification of the reinforcing means.

Reinforcing means 15 and 16 may be additionally stiffened by the use of cross-link members 18 placed in the spaces between adjacent ribs 17 thereby connecting the ribs to each other (See FIG. 8). The members 18 may be formed in the same manner as reinforcing means 15 and 16 or in any other manner desired. While only one pattern is shown for the positioning of cross-link members 18, it is apparent that various other patterns may be used. Preferably, the cross-link members 18 are arranged such that one cross-link member 18 is placed in between adjacent ribs 17 and radially outward of the maximum section width SD with respect to the axis of rotation of the tire 1 and in close proximity to maximum section width SD, and when viewed from the mid-circumferential plane of the tire the cross-link members form an annular pattern.

While certain representative embodiments and details have been shown for purposes of illustrating the invention, it will be apparent to those skilled in this art that various changes and modifications may be made therein without departing from the spirit or scope of the invention.

What is claimed is:

1. A safety pneumatic tire for a passenger vehicle: comprising a circumferentially extending ground-engaging tread portion, a pair of sidewall portions, a pair of shoulder portions, a pair of bead portions, a carcass ply structure which extends from said bead portion to said bead portion, said carcass ply structure having at least one layer of parallel reinforcing cords, said tire characterized in that the internal sidewall surfaces are provided with a reinforcing means which extends circumferentially about said tire and uninterrupted along the internal surface of the tire from a point radially below the maximum section width of said tire to a point beneath said tread portion, said reinforcing means terminating prior to reaching the mid-circumferential plane of the tire, the surface of said reinforcing means facing the tire cavity having generally a corrugated cross-sectional configuration, as viewed in a plane perpendicular to the tire surface and radial plane of said tire, said corrugations lying in a plane substantially perpendicular to the mid-circumferential plane of the tire, the thickness of said corrugations being greater than the thickness of said sidewall of said tire measured at the maximum section width of said tire exclusive of adornment of other indicia, the distance between center lines of adjacent corrugations divided by the thickness of said corrugations being at least equal to two but less than or equal to five, said reinforcing means being made from a rubber compound having a Shore A hardness ranging from 70 to 85 and having a modulus greater than 45 Kp/cm$^2$.

2. The tire according to claim 1 wherein the end of said reinforcing means beneath said tread portion is spaced from the tread edge a distance greater than 50 percent of the distance from the tread edge to the mid-circumferential plane of said tire, the other end of said reinforcing means below the maximum section width of said tire terminating radially inward of said maximum section width a distance less than 50 percent of the distance from said maximum section width of said tire to the bead base line of said tire.

3. The tire according to claim 1 wherein said reinforcing means comprises a plurality of equally spaced rib structures which lie in a substantially radial plane with respect to the mid-circumferential plane of said tire.

4. The tire according to claim 3, wherein said tire is provided with a plurality of cross-link members placed in the space between adjacent rib structures.

5. The tire according to claim 4 wherein said cross-link members are arranged such that one cross-link member is placed in between adjacent ribs and radially outward of said maximum section width with respect to the axis of rotation of said tire and in close proximity to said maximum section width and when viewed from said mid-circumferential plane of said tire the cross-link members form an annular pattern.

6. The tire according to claim 1 wherein a lubricant is provided internally of said tire.

7. The tire according to claim 1 wherein said surface of said reinforcing means facing the tire cavity is sinusoidal in cross-sectional configuration.

8. The tire according to claim 1 wherein said surface of said reinforcing means facing the tire cavity is square-toothed in cross-sectional configuration.

9. The tire according to claim 1 wherein said surface of said reinforcing means facing the tire cavity is triangular in cross-sectional configuration, the base of said triangular configuration being adjacent to the inner sidewall surface of said tire.

10. The tire according to claim 1 wherein said reinforcing means is made from a rubber compound having a low compression set value.

11. The tire according to claim 10 wherein said rubber compound has a 10 percent compression set value when the compound is subjected to a 25 percent compression test.

12. The tire according to claim 1 wherein said tire has an aspect ratio in the range of 30 to 80.

13. The tire according to claim 12 wherein said tire has an aspect ratio in the range of 50 to 65.

14. The tire according to claim 1 wherein the thickness of said sidewall of said tire is 0.2 inch (5 mm) and the thickness of said corrugations is in the range of 0.2 inch (5 mm) to 0.6 inch (15 mm).

15. The tire according to claim 1 wherein the thickness of said corrugation divided by the sidewall thickness of said tire measured at the maximum section width of said tire exclusive of adornment or other indicia is at least one but less than three.

16. The tire according to claim 1 wherein said reinforcing means is made from a rubber compound having a low hysteresis value.

17. The tire according to claim 1 wherein the axial distance between the bead heel shart points when said tire is mounted on a standard rim at normal inflation pressure is not greater than the tread width of said tire.

18. The tire according to claim 1 wherein the bead heel sharp points lie a distance from a plane perpendicular to the axis of the tire passing through the tread edge of said tire no greater than the distance in which the ends of said reinforcing means beneath said tread portion lie from said plane perpendicular to the axis of the tire passing through the tread edge of said tire, when said tire is mounted on a standard rim at normal inflation pressures.

19. The tire according to claim 1 further comprising a tread reinforcing belt structure placed about said carcass and beneath said ground-engaging tread portion, said belt structure extending from shoulder portion to shoulder portion.

20. A safety pneumatic tire for a passenger vehicle: comprising a circumferentially extending ground-engaging tread portion, a pair of sidewall portions, a pair of shoulder portions, a pair of bead portions, a substantially radial carcass ply structure which extends from said bead portion to said bead portion, said carcass ply structure having at least one layer of parallel reinforcing cords, a reinforcing belt structure placed about said carcass and beneath said ground-engaging tread portion, said belt structure extending from shoulder portion to shoulder portion; said tire characterized in that the internal sidewall surfaces are provided with a reinforcing means which extends circumferentially about said tire and uninterruptedly along the internal surface of the tire from a point radially below the maximum section width of said tire to a point beneath said tread portion, said reinforcing means terminating prior to reaching the mid-circumferential plane of the tire, the surface of said reinforcing means facing the tire cavity having generally a corrugated cross-sectional configuration, as viewed in a plane perpendicular to the tire surface and radial plane of said tire, said corrugations lying in a plane substantially perpendicular to the mid-circumferential plane of the tire, the thickness of said corrugations being greater than the thickness of said sidewall of said tire measured at the maximum section width of said tire exclusive of adornment or other indicia, the distance between center lines of adajacent corrugations divided by the thickness of said corrugations being at least equal to two but less than or equal to five, said reinforcing means being made from a rubber compound having a Shore A hardness ranging from 70 to 85 and having a modulus greater than 45 kp/cm$^2$.

21. The tire according to claim 20 wherein the end of said reinforcing means beneath said tread portion is spaced from the tread edge a distance greater than 50 percent of the distance from the tread edge to the mid-circumferential plane of said tire, the other end of said reinforcing means below the maximum section width of said tire terminating radially inward of said maximum section width a distance less than 50 percent of the distance from said maximum section width of said tire to the bead base line of said tire.

22. The tire according to claim 20 wherein said reinforcing means comprises a plurality of equally spaced rib structures which lie in a substantially radial plane with respect to the mid-circumferential plane of said tire.

23. The tire according to claim 22 wherein said tire is provided with a plurality of cross-link members placed in the space between adjacent rib structures.

24. The tire according to claim 23 wherein said cross-link members are arranged such that one cross-link member is placed in between adjacent ribs and radially outward of said maximum section width with respect to the axis of rotation of said tire and in close proximity to said maximum section width and when viewed from said mid-circumferential plane of said tire the cross-link members form an annular pattern.

25. The tire according to claim 20 wherein a lubricant is provided internally of said tire.

26. The tire according to claim 20 wherein said surface of said reinforcing means facing the tire cavity is sinusoidal in cross-sectional configuration.

27. The tire according to claim 20 wherein said surface of said reinforcing means facing the tire cavity is square-toothed in cross-sectional configuration.

28. The tire according to claim 20 wherein said surface of said reinforcing means facing the tire cavity is triangular in cross-sectional configuration, the base of said triangular configuration being adjacent to the inner sidewall surface of said tire.

29. The tire according to claim 20 wherein said reinforcing means is made from a rubber compound having a low compression set value.

30. The tire according to claim 29 wherein said rubber compound has a 10 percent compression set value when the compound is subjected to a 25 percent compression test.

31. The tire according to claim 20 wherein said tire has an aspect ratio in the range of 30 to 80.

32. The tire according to claim 31 wherein said tire has an aspect ratio in the range of 50 to 65.

33. The tire according to claim 20 wherein the thickness of said sidewall of said tire is 0.2 inch (5 mm) and the thickness of said corrugations is in the range of 0.2 inch (5 mm) to 0.6 inch (15 mm).

34. The tire according to claim 20 wherein the thickness of said corrugation divided by the sidewall thickness of said tire measured at the maximum section width of said tire exclusive of adornment or other indicia is at least one but less than three.

35. The tire according to claim 20 wherein said reinforcing means is made from a rubber compound having a low hysteresis value.

36. The tire according to claim 20 wherein the axial distance between the bead heel sharp points when the tire is mounted on a standard rim at normal inflation pressure is no greater than the tread width of said tire.

37. The tire according to claim 20 wherein the bead heel sharp points lie a distance from a plane perpendicular to the axis of the tire passing through the tread edge of said tire no greater than the distance in which the ends of said reinforcing means beneath said tread portion lie from said plane perpendicular to the axis of the tire passing through the tread edge of said tire, when said tire is mounted on a standard rim at normal inflation pressures.

38. A pneumatic tire and rim assembly for passenger vehicles comprising a tire having a circumferentially extending ground-edging tread portion, a pair of sidewalls, a pair of bead portions, a carcass ply structure which extends from said bead portion to said bead portion, said carcass ply structure having at least one layer of parallel reinforcing cords, said tire mounted on a rim; said tire and rim assembly characterized in that the internal sidewall surfaces of said tire are each provided with a reinforcing means which extends circumferentially about said tire and uninterruptedly along the internal surface of said tire from a point radially below the maximum section width of said tire to a point beneath the tread portion, said reinforcing means terminating prior to reaching the mid-circumferential plane of said tire, the surface of said reinforcing means facing the tire cavity having a generally corrugated cross-sectional configuration as viewed in a plane perpendicular to the tire surface and radial plane of said tire, said corrugations lie in a plane substantially perpendicular to the mid-circumferential plane of said tire, the thickness of said corrugations being greater than the thickness of said sidewall of said tire measured at the maximum section width of said tire exclusive of adornment or other indicia, the distance between center lines of adjacent corrugations divided by the thickness of said corrugations being at least equal to two but less than or equal to five, said reinforcing means being made from said rubber compound having a Shore A hardness ranging from 70 to 85 and having a modulus greater than 45 kp/cm$^2$, the bead seats are spaced a distance apart such that the distance between the bead heel sharp points when the tire is mounted on a standard rim at normal inflation pressure is no greater than the tread width of said tire.

39. The tire and rim assembly according to claim 38 wherein the bead heel sharp points lie a distance from a plane perpendicular to the axis of the tire passing through the tread edge of said tire no greater than the distance in which the ends of said reinforcing means beneath said tread portion lie from said plane perpendicular to the axis of the tire passing through the tread edge of said tire, when said tire is mounted on a standard rim at normal inflation pressures.

40. The tire and rim assembly according to claim 38 wherein the end of said reinforcing means beneath said tread portion is spaced from the tread edge a distance greater than 50 percent of the distance from the tread edge to the mid-circumferential plane of said tire, the other end of said reinforcing means below the maximum section width of said tire terminating radially inward of said maximum section width a distance less than 50 percent of the distance from said maximum section width of said tire to the bead base line of said tire.

41. The tire and rim assembly according to claim 38 wherein said reinforcing means comprises a plurality of equally spaced rib structures which lie in a substantially radial plane with respect to the mid-circumferential plane of said tire.

42. The tire and rim assembly according to claim 41 wherein said tire is provided with a plurality of cross-link members placed in the space between adjacent rib structures.

43. The tire and rim assembly according to claim 42 wherein said cross-link members are arranged such that one cross-link member is placed in between adjacent ribs and radially outward of said maximum section width with respect to the axis of rotation of said tire and in close proximity to said maximum section width and when viewed from said mid-circumferential plane of said tire the cross-link members form an annular pattern.

44. The tire and rim assembly according to claim 38 wherein a lubricant is provided internally of said tire.

45. The tire and rim assembly according to claim 38 wherein said surface of said reinforcing means facing the tire cavity is sinusoidal in cross-sectional configuration.

46. The tire and rim assembly according to claim 38 wherein said reinforcing means facing the tire cavity is square-toothed in cross-sectional configuration.

47. The tire and rim assembly according to claim 38 wherein said surface of said reinforcing means facing the tire cavity is triangular in cross-sectional configuration, the base of said triangular configuration being adjacent to the inner sidewall surface of said tire.

48. The tire and rim assembly according to claim 38 wherein said reinforcing means is made from a rubber compound having a low compression set value.

49. The tire and rim assembly according to claim 48 wherein said rubber compound has a 10 percent compression set value when the compound is subjected to a 25 percent compression test.

50. The tire and rim assembly according to claim 38 wherein said tire has an aspect ratio in the range of 30 to 80.

51. The tire and rim assembly according to claim 50 wherein said tire has an aspect ratio in the range of 50 to 65.

52. The tire and rim assembly according to claim 38 wherein the thickness of said sidewall of said tire is 0.2 inch (5 mm) and the thickness of said corrugations is in the range of 0.2 inch (5 mm) to 0.6 inch (15 mm).

53. The tire and rim assembly according to claim 38 wherein the thickness of said corrugation divided by the sidewall thickness of said tire measured at the maximum section width of said tire exclusive of adornment or other indicia is at least one but less than three.

54. The tire and rim assembly according to claim 38 wherein said reinforcing means is made from a rubber compound having a low hysteresis value.

55. The tire and rim assembly according to claim 38 further comprising a tread reinforcing belt structure placed about said carcass and beneath said ground-engaging tread portion, said reinforcing structure extending from shoulder portion to shoulder portion.

* * * * *

UNITED STATES PATENT AND TRADEMARK OFFICE
CERTIFICATE OF CORRECTION

PATENT NO. : 4,405,007
DATED : September 20, 1983
INVENTOR(S) : Thomas N. H. Welter It is certified that error appears in the above-identified patent and that said Letters Patent are hereby corrected as shown below:

In column 1, line 19 "simple" should be changed to -- simply -- ;

In column 3, line 9 "thread" should be changed to -- tread -- ;

In column 6, line 31 "of" should be changed to -- or -- .

Signed and Sealed this

Twelfth Day of June 1984

[SEAL]

Attest:

GERALD J. MOSSINGHOFF

Attesting Officer

Commissioner of Patents and Trademarks